United States Patent
Pollard et al.

(10) Patent No.: US 7,640,508 B2
(45) Date of Patent: Dec. 29, 2009

(54) METHOD AND APPARATUS FOR GENERATING IMAGES OF A DOCUMENT WITH INTERACTION

(75) Inventors: Stephen Bernard Pollard, The Street Uley Dursley (GB); Stephen Philip Cheatle, Bristol (GB); David Arthur Grosvenor, Frampton Cotterell (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 943 days.

(21) Appl. No.: 10/914,552

(22) Filed: Aug. 9, 2004

(65) Prior Publication Data

US 2005/0047683 A1    Mar. 3, 2005

(30) Foreign Application Priority Data

Aug. 12, 2003   (GB)   ................... 0318843.0

(51) Int. Cl.
    *G06F 3/00*    (2006.01)
(52) U.S. Cl. .................. 715/760; 715/740; 715/753
(58) Field of Classification Search ............... 715/719, 715/730, 736, 740, 751–759, 760, 838; 328/166, 328/232, 254
    See application file for complete search history.

(56) References Cited

U.S. PATENT DOCUMENTS

| | | | |
|---|---|---|---|
| 5,568,279 A | | 10/1996 | Hinman et al. |
| 6,976,220 B1 | * | 12/2005 | Lapstun et al. ............... 715/753 |
| 7,015,954 B1 | * | 3/2006 | Foote et al. .............. 348/218.1 |
| 2002/0180726 A1 | * | 12/2002 | Shi et al. ..................... 345/418 |
| 2003/0081014 A1 | * | 5/2003 | Frohlich ...................... 345/856 |
| 2004/0128350 A1 | * | 7/2004 | Topfl et al. ................... 709/204 |
| 2004/0201709 A1 | * | 10/2004 | McIntyre et al. ......... 348/211.2 |
| 2005/0062844 A1 | * | 3/2005 | Ferren et al. ............. 348/14.08 |

OTHER PUBLICATIONS

Search Report dated Jan. 16, 2004.

* cited by examiner

*Primary Examiner*—Sara M Hanne
*Assistant Examiner*—Shashi K Becker

(57) ABSTRACT

Embodiments provide a system and method for generating images of a document with interaction of a primary user with the document in an interaction session. Briefly described, one embodiment comprises an image capture means adapted to capture an initial image of the document without interaction by a user and to subsequently capture at least one additional image of the document during an interaction session including interaction from the user during that session, and a processing means adapted to generate a data set representing the interaction session from the initial image and the additional image, the data set containing at least the initial image along with information indicative of the interaction of the user during the session obtained from the additional image.

15 Claims, 5 Drawing Sheets

METHOD AND APPARATUS FOR GENERATING IMAGES OF A DOCUMENT WITH INTERACTION

TECHNICAL FIELD

This invention relates to apparatus for generating images of a document with interaction of a primary user with the document in an interaction session. It also relates to a method of sharing documents and interacting with the images across a network.

CLAIM TO PRIORITY

This application claims priority to copending United Kingdom utility application entitled, "Method And Apparatus For Generating Images Of A Document With Interaction," having serial no. GB 0318843.0, filed Aug. 12, 2003, which is entirely incorporated herein by reference.

BACKGROUND

It is known to provide apparatus which captures images of a primary user at one location interacting with a document or other object. The captured images can subsequently be displayed at a remote site as an image of the document/object and the interaction of the primary user with the document. To be truly useful such apparatus should provide real time images (or almost real time) of the interaction and the document, although the images may be recorded for subsequent transmission to the remote user.

For document sharing with interaction specialist electronic sharing tools have been developed which support the sharing of electronic documents between users across a network. Each user is provided with a computer which is connected to the network and includes a display upon which an image of the document can be presented. It is useful to enable a user to interact with the document and in many applications (such as Netmeeting® by Microsoft Corporation of Redmond Drive, Seattle, Wash., USA) the user can interact with the images by moving a cursor around the screen. The movement of the cursor is then displayed on every users screen at the same time.

The ability to interact with an electronic document through the use of a pointer such as a mouse is difficult and some users do not find it a natural way to interact with a document. The interaction can be very stilted and it does not offer the range of interactions possible when co-present. Working with a hard copy or an original of a document is also easier for many users than interacting with an image on a screen.

Video conferencing, as a genuine alternative, allows a user at a remote site to see how a primary user interacts with an object. A user can then interact with the document and the interaction will also be caught on camera provided it is in the field of view of the camera. The stream of images are then either stored on a tape or the like for time-shifted viewing or perhaps sent across a network to the remote user where the images are reproduced on a screen. The remote user can then see the areas of the document that the user is pointing to.

In order to provide sufficient resolution for a document to be readable by a remote user and also to cover the area of a typical A4 document, the amount of storage space needed and/or the bandwidth needed for the connection to the remote user must be very high. This can be ameliorated by reducing the capture rate of the camera, although the resulting jerky images then make the interaction difficult to follow.

SUMMARY

Embodiments provide a system and method for generating images of a document with interaction of a primary user with the document in an interaction session. Briefly described, one embodiment comprises an image capture means adapted to capture an initial image of the document without interaction by a user and to subsequently capture at least one additional image of the document during an interaction session including interaction from the user during that session, and a processing means adapted to generate a data set representing the interaction session from the initial image and the additional image, the data set containing at least the initial image along with information indicative of the interaction of the user during the session obtained from the additional image.

Another embodiment is a method of sharing document interaction information across a network comprising generating an initial high-resolution image of the document; sending information indicative of the high-resolution image across a network to a remote device; rendering the high-resolution image on a display at the remote device; generating at least one subsequent image of the document together with the interaction of a user with the document, the subsequent image having a lower resolution than the high-resolution image; and sending information indicative of the content of at least a portion of the subsequent image across the network to the remote device.

BRIEF DESCRIPTION OF THE DRAWINGS

The components in the drawings are not necessarily to scale relative to each other. Like reference numerals designate corresponding parts throughout the several views.

DETAILED DESCRIPTION

There will now be described, by way of example only, an exemplary embodiment with reference to the accompanying drawings. The apparatus illustrated in FIG. 1 comprises a primary user device 100 connected across a network 200 to two remote user devices 300. The network 200 in this illustrative example comprises a telecommunications network of optical fibre with each of the primary and remote user devices connecting to the network 200 using a compatible modem. Any other suitable communication network may be used.

Figure 2:
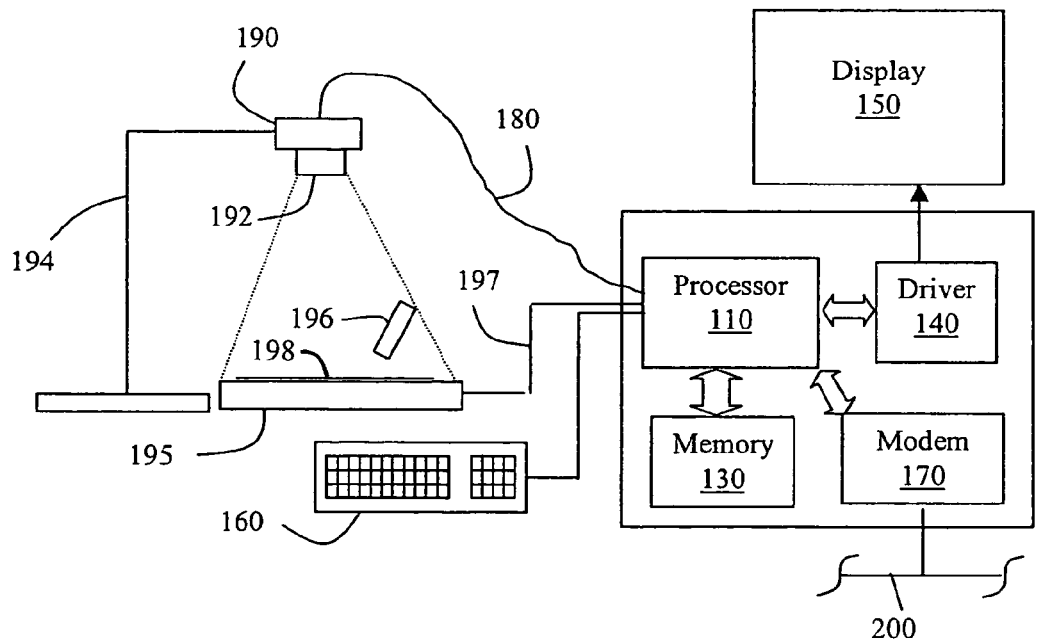
FIG. 2 is a higher detail schematic view of the primary user device provided at a location at which interaction with a document is required.

The primary user device 100 is located at the premises of a primary user and is illustrated in more detail in FIG. 2 of the accompanying drawings, whilst the remote user devices 300 are situated at other remote locations. Placement of the remote device uses any suitable connection to the network 200.

Figure 1:
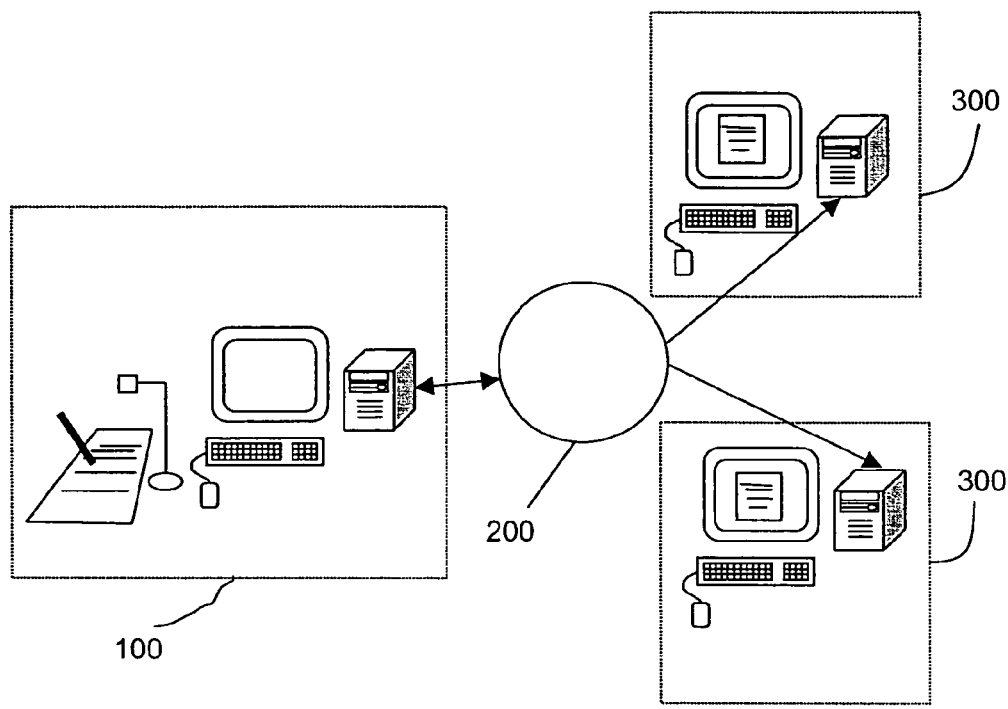
FIG. 1 is an overview of a networked apparatus which comprises one exemplary embodiment.

The primary user device 100 (FIG. 1) comprises a processor 110, which is connected across a bus to a memory 130, a display driver 140, a display 150, such as, but not limited to, a computer monitor screen, an input device 160, which in this example comprises a keyboard, and a modem 170. The memory 130 stores program instructions which are to be executed on the processor 110. The modem 170 connects the primary user device 100 to the network 200 (FIG. 1). These components could be embodied as a personal computer, laptop computer, or the like.

The processor 110 is also connected through a cable 180 to a camera 190. The camera 190 comprises a fixed focus length lens 192 positioned in front of a detector (not shown). The detector comprises a charge-coupled device having an array of light sensitive pixels. The camera 190 includes a read-out circuit, which measures the output of each pixel at an instant in time and produces an image from the outputs. This image is passed along the cable 180 to the processor 110 where it is subsequently passed to the memory 130 for storage.

An image capturing device, in this example provided by camera 190, is supported by a metal stand 194 at a fixed height above a surface such as a desktop on which the stand 194 is placed. In the example shown in FIG. 2, the surface comprises an electronic tablet 195, such as, but not limited to, that sold under the name Wacom® by Wacom Technology Corporation, 1311 SE Cardinal Court, Vancouver, Wash. 98683, USA. A document 198, which a user wishes to interact with, is placed on the tablet 195 within the field of view of the camera 190. The electronic tablet 195 detects the position of a pointer 196 which can be used by a presenter to interact with the document 198 on the tablet 195. The tablet 195 generates a set of co-ordinates which indicate where the pointer 196 is relative to the tablet 195. These co-ordinates are passed along a cable 197 to the processor 110.

The camera 190 is calibrated with respect to the tablet 195 so that points in the field of view of the camera 190 are at known co-ordinates of the tablet 195, and an initial image of the document 198 is captured by the camera 190. The image is captured at the highest resolution of the camera 190, and the resulting image of the document is overlain with a co-ordinate grid and stored in the memory. During a presentation session in which a user interacts with the document 198 by moving the pointer 196, the co-ordinates of the pointer 196 are fed to the processor 110. Since the co-ordinates of the document image are known, this information allows the location of the pointer 196 relative to the document 198 to be determined.

Of course, the exact nature of the pointer 196 is not essential to this embodiment. The key feature of any pointer 196, which may even be the primary user's hand, is that its position can be determined in terms of the co-ordinate frame of the camera 190. Using a tablet 195 which is calibrated to the camera 190 is only one solution. The camera 190 could, in an alternative embodiment, capture images of the pointer 196.

During capture of the interaction, the camera 190 continues to view the document 198 and images of the document 198 are captured at regular intervals.

The initial high-resolution document image is passed across the network 200 (FIG. 1) together with lower resolution interaction information recording images of interaction. The lower resolution information may, in one embodiment, comprise a stream of low-resolution images (which may have been captured at a lower resolution by the camera 190, or converted into lower resolution form by processing means, here having the form of the processor 110, suitably programmed for image manipulation and/or analysis) of the document 198 and the interaction. In an alternative embodiment, the processing means may be suitably configured just to extract the part of the image showing interaction, the "interaction element" of the captured images.

Figure 5:
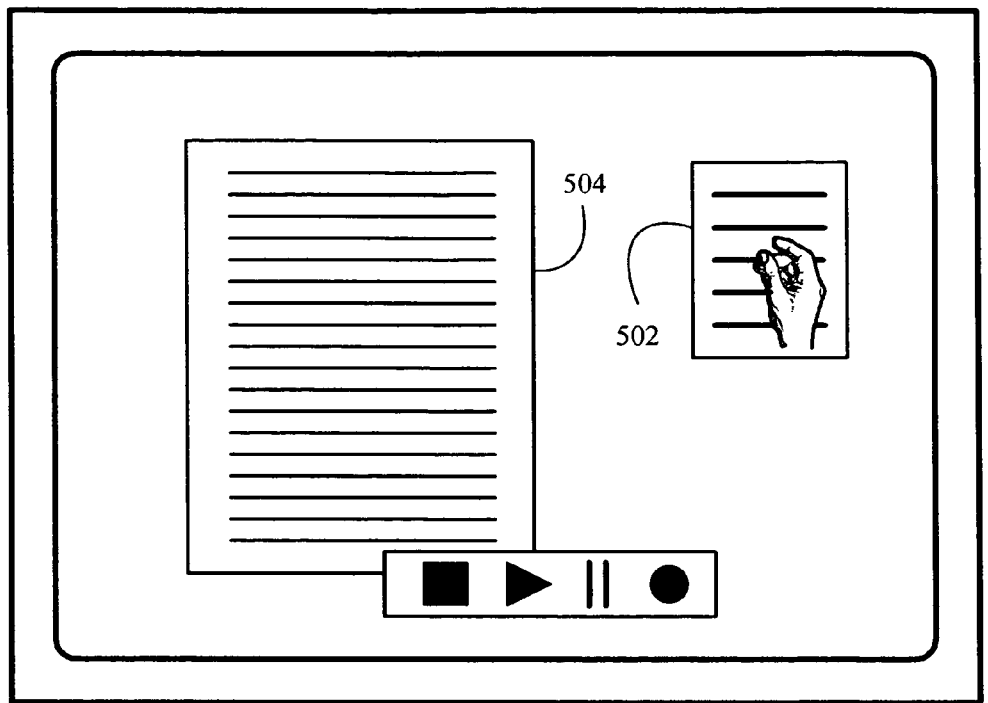
FIG. 5 is an example of the display of a high resolution document image of a low resolution document/interaction image that can be produced by the exemplary embodiment apparatus of FIG. 1.

The remote device 300 (illustrated in greater detail in FIG. 3) comprises a personal computer 302 which includes a receiver 304 which receives the information that is sent across the network 200 (this may be a modem in one embodiment), a memory buffer 308 in which the initial high resolution image is temporarily stored, a processor 310 which retrieves the buffered information and a display driver 312. The image held in the buffer 308 is fed by the processor 310 to the display driver 312. This in turn produces a video signal 314 that is sent to a video display 316 which presents the image of the document 198 (FIG. 2) to a user of the remote device 300. When the low-resolution images are received by the receiver 304, the processor 310 instructs the display driver 312 to show the low resolution image 502 alongside the high-resolution image 504 (FIG. 5). This is shown in FIG. 5 of the accompanying drawings.

Figure 6:
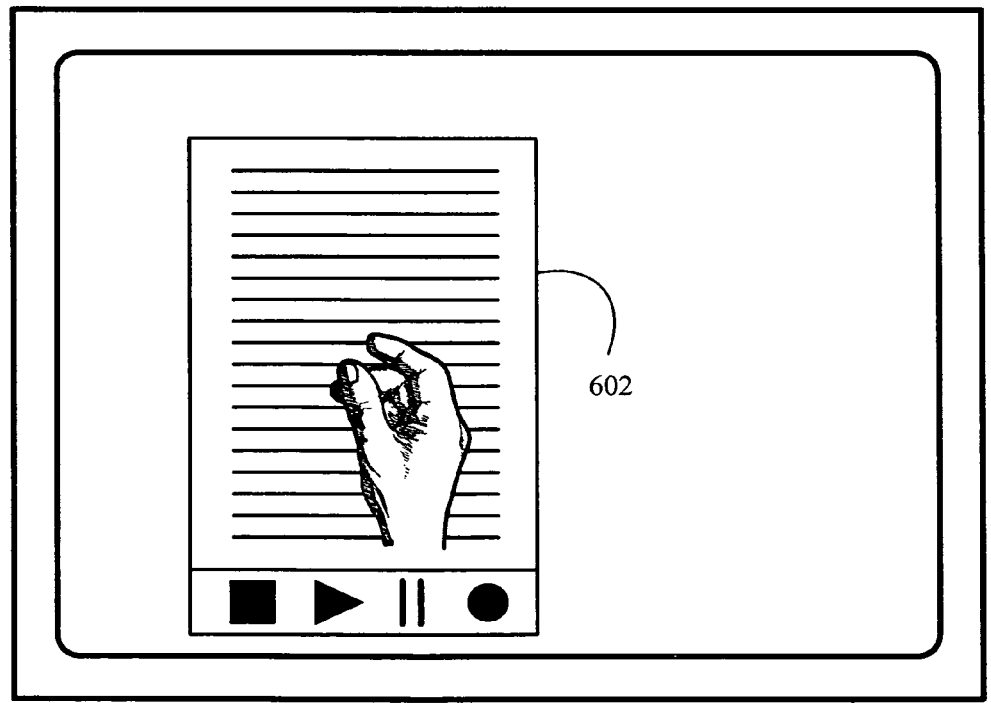
FIG. 6 is a second example of a display of a composite image made up from the high resolution image and low resolution images of the interaction.

In an alternative embodiment, where the extracted interaction information is sent across the network 200 (FIG. 1), this low resolution image 602 (FIG. 6) may be overlaid upon the high-resolution image to produce a composite image. An example of such a composite image is shown in FIG. 6 of the accompanying drawings.

Figure 4:
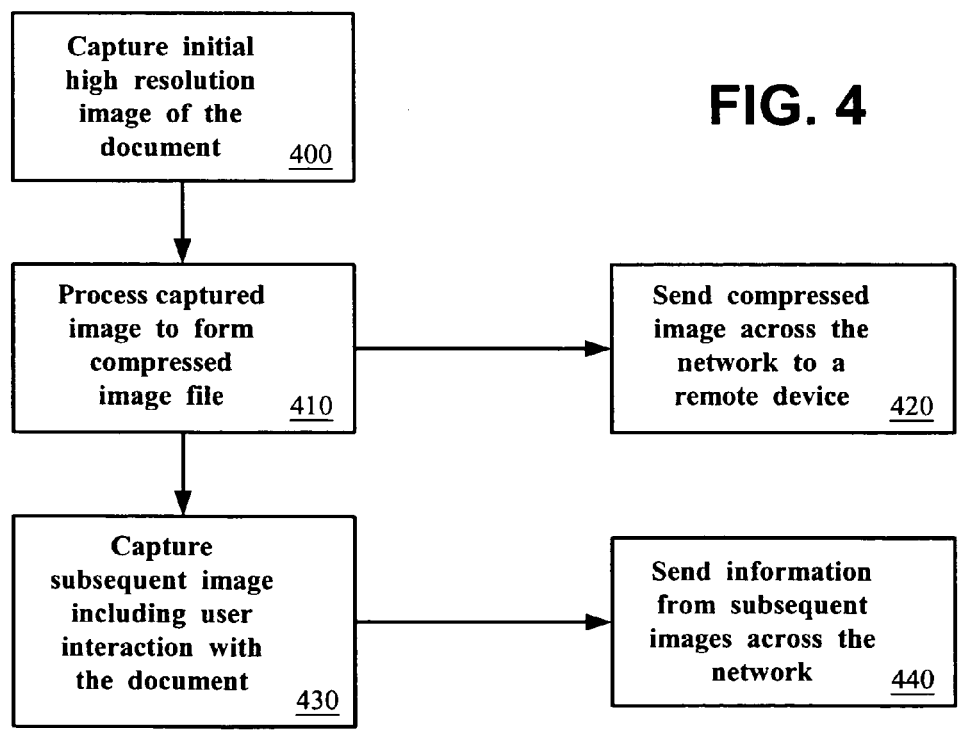
FIG. 4 is a flow chart of an exemplary process performed during the capture and presentation of a session of interaction across the networked apparatus of FIG. 1.

The operation of the apparatus can best be understood with reference to the flow chart of FIG. 4 of the accompanying drawings. It will be understood that the process of FIG. 4 may be performed by a processor executing a set of appropriate program instructions stored in an area of memory 130 (FIG. 2).

At block 400, an initial high-resolution image of the document 198 is captured by the camera 190. This event may be initiated by any user of the primary device 100. At block 410, the captured image data is processed by the processor 110 of the primary device 100 to produce a compressed image, such as, but not limited to, a PDF file.

At block 420, the compressed image is then sent across the network to the remote device where it is rendered on a display by the display driver. This displayed image has enough resolution for a user to resolve the content of the document.

At block 430, after capturing the initial high-resolution image, the interaction of a user with the document 198 is captured. This can be done either by capturing low-resolution images of the document 198 and interaction, or alternatively, by reducing the resolution of the captured images in order to reduce the size of the data files in which they are recorded. At block 440, the processor means provided by the suitably programmed processor 110 analyses the images to identify any interaction within the field of view of the camera, and sends 440 across the network information encoding the interaction information. This may be performed by either:

Extracting the interaction to send across the network;
Sending the whole low resolution image across the network; or
Producing a pointer icon which represents the users interaction with the document and sends the location of this icon across the network.

In various embodiments, the images, or partial images, or pointer co-ordinates are sent across the network 200 (FIG. 1), usually in a stream. In some embodiments, the stream could be considered to be a form of video. This is then presented at the remote device. In each case, less information needs to be transmitted than would be needed if the high-resolution image were to be continuously captured and resent.

In embodiments where only a portion of each subsequent image is transmitted, a chrominance (preferred) or luminance (less preferred) difference technique is used to determine which regions correspond to interaction and which to the background document using image difference analysis.

Figure 7:
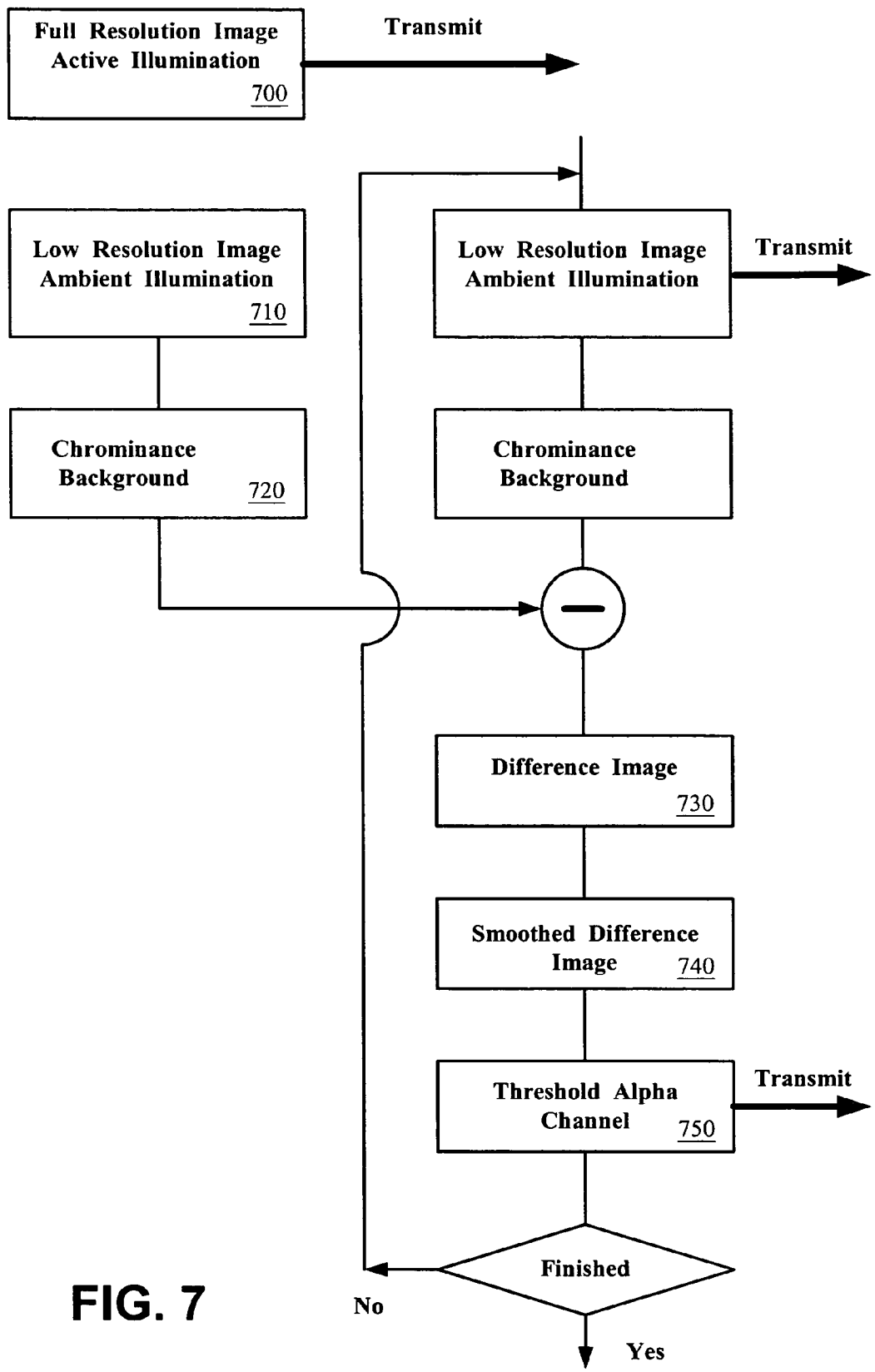
FIG. 7 is a flow chart of a process performed in separating the background document from foreground interaction using chrominance matching.

A simple method is shown in FIG. 7 of the accompanying drawings. At block 700, an initial full resolution image is captured, followed by a low-resolution image immediately afterwards at block 710. The low-resolution image is captured using just ambient illumination whilst the initial image is captured under brighter controlled lighting provided from a light source associated with the camera.

At block 720, the ambient low-resolution image is transformed from RGB to a simple two channel version R/G and B/G. At block 730, an image is constructed from the sum of the difference of the two channels. At block 740, this is smoothed (with a 2-D spatial filter) to reduce noise. At block 750, a threshold is used to give a significant difference signal. The threshold image can then be used to set parts of the foreground image to zero and/or generate an alpha channel.

In some embodiments, it is important that no foreground interaction is present in the image at the point where the background image is captured. A buzzer may be therefore provided which plays an audible beep to the user after a background ambient image has been captured to indicate that the user can now interact with the document. Alternative embodiments may provide different indications.

Figure 3:
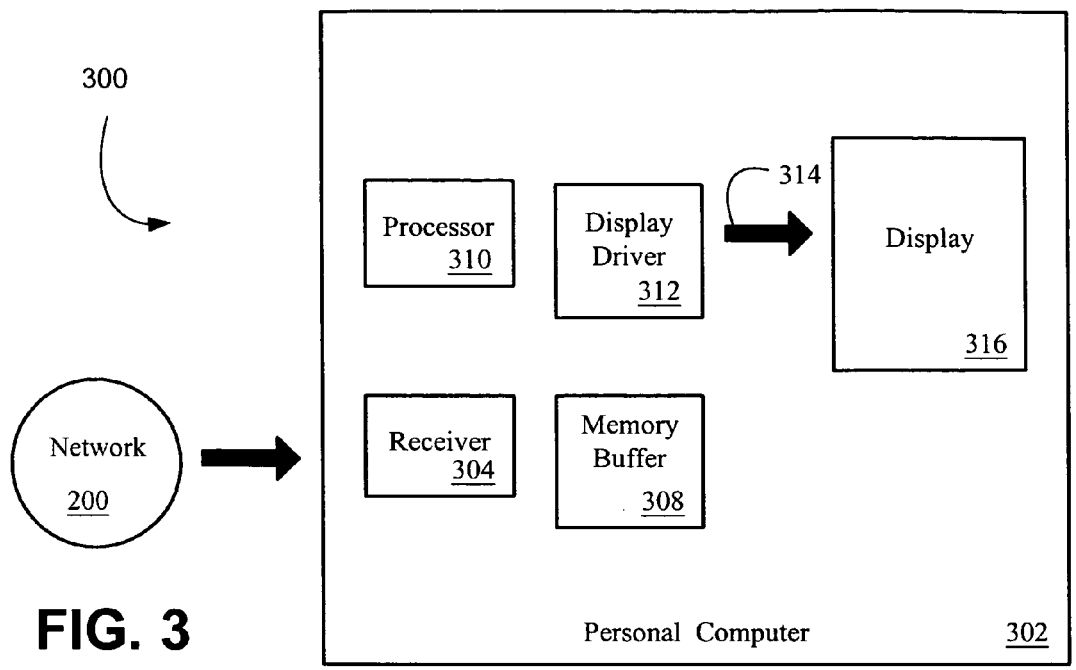
FIG. 3 is a block diagram illustrating additional detail of the remote device of FIG. 1.
Figure 8:
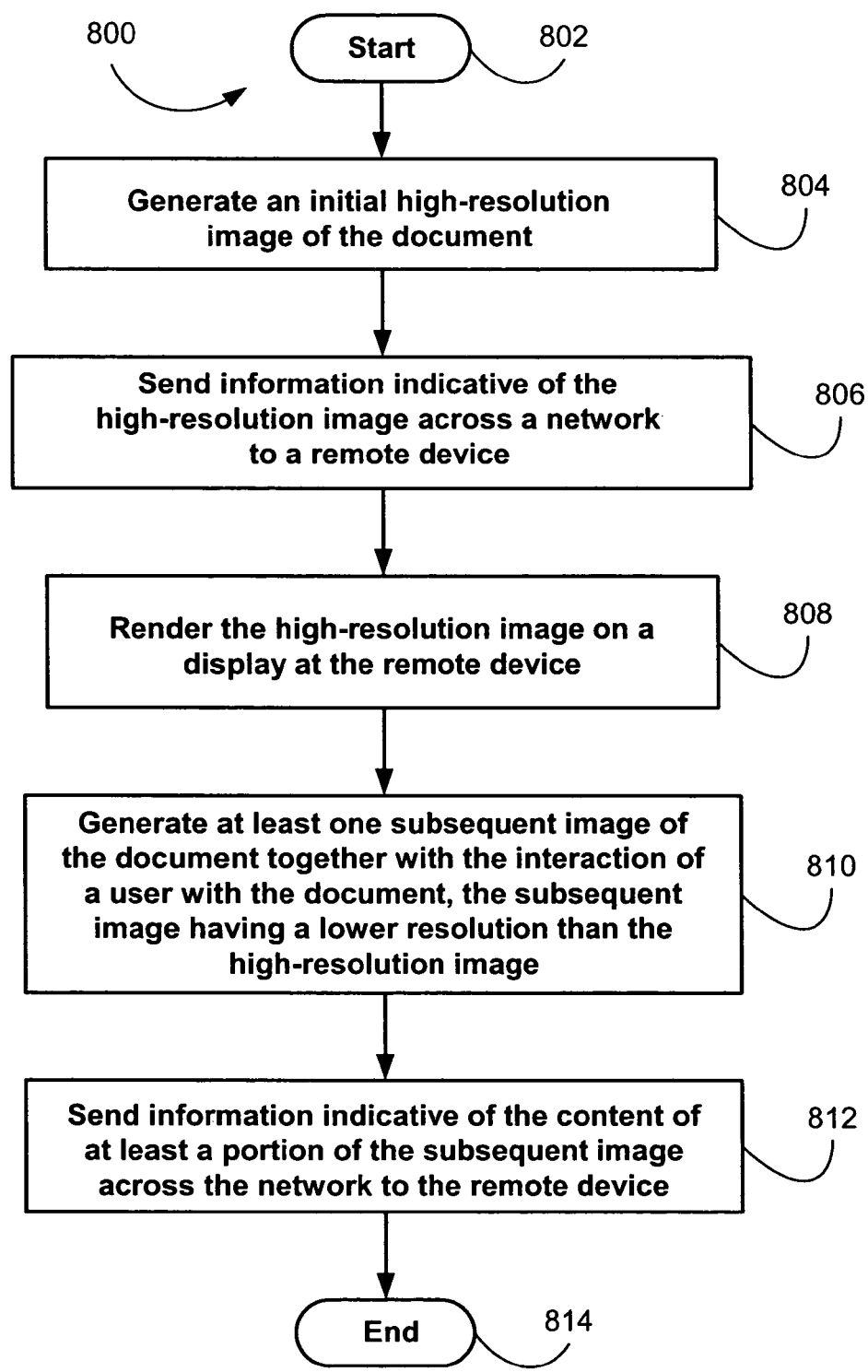
FIG. 8 is a flow chart of a process performed by an exemplary embodiment.

FIG. 8 is a flow chart of a process performed by an exemplary embodiment. The flow chart 800 shows the architecture, functionality, and operation of a possible implementation of software residing in memory 130 (FIG. 2) and/or memory 308 (FIG. 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 8 or may include additional functions. For example, two blocks shown in succession in FIG. 8 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process starts at block 802. At block 804, an initial high-resolution image of the document is generated. At block 806, information indicative of the high-resolution image is sent across a network to a remote device. At block 808, the high-resolution image is rendered on a display at the remote device. At block 810, at least one subsequent image of the document together with the interaction of a user with the document is generated, the subsequent image having a lower resolution than the high-resolution image. At block 810, information indicative of the content of at least a portion of the subsequent image is sent across the network to the remote device. The process ends at block 814.

An exemplary embodiment provides apparatus for generating images of a document and interaction of a primary user with the document in an interaction session, the apparatus comprising: image receiving means adapted to receive an initial image of the document at a first resolution and at least one subsequent, additional image of the document at a second resolution during an interaction session, the second resolution being lower than the first resolution; and in which the first image is captured without interaction by a user whilst the second images are captured during an interaction session and include interaction from the user during that session; and data generating means for generating a data set of information representing the interaction session from the initial image and the additional image, the data set containing at least the initial image along with information indicative of the interaction of the user during the session obtained from the additional image.

An exemplary embodiment may include an image capture means arranged to capture the initial image and subsequent additional images that are sent to the image receiving means. This could comprise a camera or a digital camera. The camera may capture the initial and additional images at the first and second resolutions. Otherwise it may capture them at the same resolution and they may be post-processed to reduce the resolution of the additional images relative to the resolution of the initial image.

The data set may comprise the initial image and the complete additional image. Because the additional image has a lower resolution than the initial image, it will need less bandwidth to be transmitted across the network. In a typical system, multiple additional images may be received over time to form a video of the interaction session.

The data set may alternatively comprise the initial image and only a part or parts of the additional image. This part or parts may correspond to areas of the additional image that contain some interaction by the user. The apparatus may include interaction location means which is adapted to identify within each subsequently captured image those areas of the image that correspond to interaction. For example, a wand or a users hand may be present in the image. This could be achieved by comparing the additional image with the original image and determining that any parts of the images that differ must correspond to areas of interaction.

Another exemplary embodiment provides apparatus for generating images of a document and interaction of a primary user with the document in an interaction session, the apparatus comprising: image receiving means adapted to produce an initial image of the document and at least one subsequent, additional image of the document during an interaction session; and in which the first image is of the document without interaction by a user whilst the additional image is of the document including interaction from the user during that session; interaction location means arranged to determine the location within the additional image of a user interaction; and data generating means for generating a data set of information representing the interaction session, the data set containing at least the initial image along with the location of the interaction within the additional image.

The interaction location means may comprise an image processing means such as a microprocessor circuit which executes instruction provided in a computer program which cause the processor to extract the interaction locations.

The interaction location means may be arranged to generate a set of co-ordinates indicative of the location of the extracted interaction within the additional image. These co-ordinates may form part of the data set generated by the data set generating means.

A time line may be established relating the time during the interaction session and the location of any interaction at each time. The data set need not then contain any actual parts of the additional image.

The apparatus may further include data transmission means for sending the data set across a network to a remote device. This may comprise a modem or other device which sends information across a network.

As with above-described embodiments, the apparatus may include an image capture means arranged to capture the initial image and subsequent additional images that are sent to the image receiving means. This could comprise a camera or a digital camera. The same camera may be used to capture the initial document image and also the subsequent document images during the session.

The initial image may be captured at the start of a session of interaction, or just before it starts. The additional images may be captured throughout the interaction session. A continuous stream of additional images may be captured. This may happen in real time. The captured images may form a video stream.

The image capture means may capture interaction information at predefined intervals in time during the interaction, e.g. every ⅓₀th of a second or perhaps more often than that. It may alternatively capture the information continuously.

A pointer may be provided which may be used to interact with the document. It may comprise a pointing device which can be held by a user such as a wand. On the other hand the pointer may comprise the users finger or hand or perhaps arm. In fact anything that can be used to point to a region of the document and which can be detected by the interaction-determining device is suitable. It may even comprise a virtual pointer such as a laser pen or other optical device which illuminates a region of the document and can be detected by a camera.

Also, the data set contains sufficient information to be sent across the network such that the remote device can display to a user a composite image of the document and the interaction. A user of the remote device can "see" the interact-ion of the primary user with the document.

Additionally or alternatively an embodiment may include data storage means for storing the generated data set. The data storage means may record the data to any one of a variety of storage media such as DVD or magnetic video cassette or perhaps to the hard drive of a computer.

Another exemplary embodiment provides a system for generating images of a document and interaction of a primary user with the document in an interaction session and the display of the document and interaction at a remote location, the system comprising: image receiving means adapted to receive an initial image of the document at a first resolution and at least one additional image of the document at a second resolution during an interaction session, the first resolution being greater than the second resolution; and data transmission means for sending a data set of information including the initial captured image and information indicative of the content of at least a part of the additional image across a network to the remote device; and in which the remote device comprises a display which is adapted to present to a user of the remote device information obtained from the initial image of the document and the information indicative of the part of the additional image which have been sent across the network.

The display may be adapted to display the initial image, or an image derived therefrom, together with a separate image derived from the information indicative of the additional image. The separate image may be presented alongside or above or below the initial image.

The information indicative of the additional image that is sent across the network may comprise the whole or a substantial part of each of the additional image.

The display may alternatively be adapted to present to a user a composite image produced from the initial image and the information from the additional image. In this case only the part of the additional image corresponding to interaction may be included in the data set and this may be overlaid with the initial image to form the composite.

Another exemplary embodiment provides a system for generating images of a document and interaction of a primary user with the document in an interaction session and the display of the document and interaction at a remote location, the system comprising: image receiving means arranged to receive an initial image of the document which is free from user interaction and at least one additional image of the document produced during an interaction session and which includes user interaction; interaction location means arranged to determine the location of a user interaction within the additional image; and data transmission means for sending a data set of information including the initial captured image and the location of the interaction in the additional image across a network to the remote device; and in which the remote device comprises a display which is adapted to present to a user of the remote device a composite image comprising the initial image of the document overlaid with a pointer icon positioned at the location of the interaction included in the data set.

The system may generate a set of pointer co-ordinates indicative of the location of the extracted interaction and these may form part of the data set. The remote device may produce a composite image in which a pointer icon is overlaid on the original image at a location according to the pointer co-ordinates which have been sent across the network.

The systems of both the third and fourth aspects of some embodiments may include several additional features. For example, an image capture device may be provided which is arranged to capture the additional image and the subsequent additional image or images and send them to the image receiving means.

The initial image may be produced at a higher resolution than the subsequent images. It may have at least twice the resolution, or three times or more. It may have sufficient resolution to allow a user to interpret all of the information presented in the captured document. The subsequent images, on the other hand, may be of such a resolution that all of the information cannot be interpreted when the image is displayed.

The system may provide synchronous or asynchronous communication. In the later case the remote device may provide the user with controls allowing the user to move forwards or backwards through the sequence of the displayed separate images. For example, a sequence of low resolution images displayed alongside a high resolution initial image may be played by a user much like a video clip during an interaction session. The controls would allow the user to fast forward or rewind the video of images, or perhaps pause the images.

There may, of course, be more than one remote device connected to the network at any one time. For instance, many users may wish to see a document and interaction at any one time. In this case, each remote device will receive from the network an initial image and the subsequent mapped pointer co-ordinates.

The data indicative of the captured image that is sent across the network may comprise compressed data which encodes the captured image. It may include some loss of data. Suitable data formats include TIFF, GIF, PDF, JPEG.

Where appropriate the co-ordinates of the pointer location sent across the network may comprise x-y co-ordinates or polar co-ordinates or any other type of co-ordinate. All that is needed is that the remote device is able to tell from the co-ordinates which part of the initial document is to be overlain with a pointer icon.

The pointer icon may comprise an arrow, or perhaps an image of a styled hand or a pointing finger. Many other types of icon could be used.

Audio capture means may also be provided which is adapted to capture any sounds (such as speech) made during the interaction. The captured audio may be transmitted across the network. A microphone may be provided at the primary user device and a loud speaker may be provided at the remote user device.

The remote device may also include a facility to zoom in on any of the displayed images if additional detail is needed.

Where a composite image is formed the video overlay may need to be scaled to the same size as the high-resolution image and combined with it so that the changing—interaction—parts are updated.

In order to support the composition of the foreground interaction over the background high-resolution image it may be shape coded. That is, a separate binary alpha map is used to identify which pixels belong to the overlay video; it is either on (1) or off (0). This scheme is used in version 1 of the MPEG 4 standard (ISO/IEC 14496). Alternatively a multilevel alpha channel can be used to allow blending of the foreground video object with the background image.

In various embodiments, the alpha channel to be coded losslessly. However, this does not introduce such a large overhead as the alpha channel generally consists of just two values, zero and one, to allow no overlay and complete overlay respectively. Given the cohesiveness of the overlay portion such images are easily compressed in a lossless fashion using standard run-length encoding schemes. More sophisticated blending schemes may use alpha values between 0 and 1 along the boundaries of the overlay section to give a more natural blend.

Another exemplary embodiment provides a method of sharing document interaction information across a network comprising: generating an initial high-resolution image of the document using an image capture device; sending information indicative of the image across a network to the remote device where it is rendered on a display; generating a plurality of subsequent images of the document together with the interaction of a user with the document, the second images having a lower resolution than the first image; and sending information indicative of the content of at least a portion of the subsequent images across the network to the remote device.

The method may comprise capturing the additional images at a lower resolution than the initial image. Otherwise, all images may be captured at the same resolution but the subsequent images may be post-processed so that their resolution is reduced, thus reducing the amount of memory needed to store them. The step of sending information across the network may comprise the step of sending the initial image and the subsequent images.

The method may include an additional step of extracting from the subsequent images the location of a users interaction with the document and in which the step of sending information across the network comprises sending the original image along with a set of co-ordinates representing the extracted locations of the interaction.

Therefore, it will be understood that by information indicative of the content of a subsequently captured image, we may mean sending the whole or a substantial part of a subsequently captured image, or just that portion of the image that contains interaction, or sending the location of a pointer that represents the location of any interaction.

Another exemplary embodiment provides a method of sharing document interaction information across a network comprising: generating an initial high-resolution image of the document; sending information indicative of the image across a network to the remote device where it is rendered on a display; generating a plurality of subsequent images of the document together with the interaction of a user with the document; extracting from the additional images a set of pointer co-ordinates indicative of the location of a users interaction within the subsequent images; and sending the set of pointer co-ordinates across the network to the remote device.

Alternative embodiments of employing the above-described methods are not intended to be limiting and could be varied. For example, all of the images may be received before any information is sent across the network to the remote device.

Another exemplary embodiment provides a data carrier which carries a computer program which when running on a processor causes the processor to: generate an initial high-resolution image of the document using an image capture device; send information indicative of the image across a network to the remote device where it is rendered on a display; generate a plurality of subsequent images of the document together with the interaction of a user with the document, the second images having a lower resolution than the first image; and send information indicative of the content of at least a portion of the subsequent images across the network to the remote device.

Another exemplary embodiment provides a data carrier which carries a computer program which when running on a processor causes the processor to: generate an initial high-resolution image of the document; send information indicative of the image across a network to the remote device where it is rendered on a display; generate a plurality of subsequent images of the document together with the interaction of a user with the document; extract from the additional images a set of pointer co-ordinates indicative of the location of a users interaction within the subsequent images; and send the set of pointer co-ordinates across the network to the remote device.

What is claimed is:

1. A system for capturing images of a document and interaction of a primary user with the document in an interaction session and a display of the document and interaction at a remote location, the system comprising:

image capture means adapted to capture an initial image of the document before the interaction session at a first resolution and to capture at least one additional image of the document at a second resolution during the interaction session, the first resolution being greater than the second resolution; and data transmission means for sending a data set including the initial captured image and information indicative of the content of at least a part of the additional image across a network to a remote device; wherein the remote device comprises the display which is adapted to present to a user of the remote device information obtained from the initial image of the document and the information indicative of the part of the additional image which have been sent across the network, wherein the presented information comprises a composite image produced from the initial image and the additional image.

2. The system of claim 1 wherein the information indicative of the additional image that is sent across the network comprises the whole or a substantial part of each of the additional image.

3. The system of claim 2 wherein the display is adapted to display the initial image, or an image derived therefrom, together with a separate image derived from the information indicative of the additional image.

4. The system of claim 1, wherein the information indicative of the user interaction that is obtained from the additional image is the entire additional image.

5. The system of claim 1 further comprising processor means producing a pointer icon that represents the user interaction and that corresponds to a location within the document, thereby producing the data set for transmission.

6. The system of claim 1 further comprising processor means for extracting the user interaction in the additional image and encoding the extracted user interaction thereby producing the data set for transmission.

7. A method of sharing document interaction information across a network comprising:
generating an initial high-resolution image of the document that is exclusive of any user interaction with the document;
sending information indicative of the high-resolution image across the network to a remote device;
rendering the high-resolution image on a display at the remote device;
generating at least one subsequent image including interaction of a user with the document, the subsequent image having a lower resolution than the high-resolution image; and
sending the information indicative of the content of at least a portion of the subsequent image across the network to the remote device,
wherein the display is adapted to present, to a user of the remote device, a composite image produced from the initial image and from the subsequent image.

8. The method of claim 7, wherein the subsequent image is captured at the lower resolution than the high-resolution image.

9. The method of claim 7, wherein sending the information across the network further comprises sending the high-resolution image and the subsequent image.

10. The method of claim 7, further comprising extracting from the subsequent image a location of a user's interaction with the document, and wherein sending the information across the network further comprises sending the high-resolution image along with a set of co-ordinates representing the extracted location of the interaction.

11. The method of claim 7, further comprising:
identifying the user interaction in the additional image; and
encoding the user interaction thereby producing the information indicative of the content of at least the portion of the subsequent images.

12. The method of claim 7, further comprising:
identifying the user interaction in the additional image; and
producing a pointer icon the represents the user interaction and that corresponds to a location within the document, hereby producing the information indicative of the content of at least the portion of the subsequent images.

13. A memory having stored thereon a computer program which when running on a processor causes the processor to:
generate an initial high-resolution image of a document, exclusive of any user interaction with the document, using an image capture device;
send information indicative of the high-resolution image across a network to a remote device where the information is rendered on a display;
generate at least one subsequent image including interaction of a user with the document, the subsequent image having a lower resolution than the high-resolution image; and
send the information indicative of the content of at least a portion of the subsequent images across the network to the remote device,
wherein the display is adapted to present, to a user of the remote device, a composite image produced from the initial image and from the subsequent image.

14. The memory of claim 13, wherein the computer program also causes the processor to:
extract the user interaction in the additional image; and
encode the extracted user interaction thereby producing the data set for transmission.

15. The memory of claim 13, wherein the computer program also causes the processor to:
produce a pointer icon that represents the user interaction and that corresponds to a location within the document thereby producing the data set for transmission.

* * * * *